US010528178B2

(12) United States Patent
Maguire et al.

(10) Patent No.: US 10,528,178 B2
(45) Date of Patent: Jan. 7, 2020

(54) CAPACITIVE TOUCH SENSING WITH CONDUCTIVITY TYPE DETERMINATION

(71) Applicant: Sharp Kabushiki Kaisha, Osaka (JP)

(72) Inventors: Sean Thomas George Maguire, Oxford (GB); Diego Gallardo, Oxford (GB); Biregeya Jean de Dieu Mugiraneza, Osaka (JP); Yasuhiro Sugita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 82 days.

(21) Appl. No.: 15/782,964

(22) Filed: Oct. 13, 2017

(65) Prior Publication Data
US 2019/0114019 A1    Apr. 18, 2019

(51) Int. Cl.
*G06F 3/041* (2006.01)
*G06F 3/044* (2006.01)

(52) U.S. Cl.
CPC ........... *G06F 3/0416* (2013.01); *G06F 3/044* (2013.01); *G06F 3/0444* (2019.05); *G06F 3/0445* (2019.05); *G06F 3/0446* (2019.05)

(58) Field of Classification Search
CPC ........ G06F 3/041; G06F 3/0416; G06F 3/044; G06F 2203/041; G06F 2203/04106
See application file for complete search history.

(56) References Cited

U.S. PATENT DOCUMENTS

| | | | |
|---|---|---|---|
| 5,841,078 A | 11/1998 | Bisset et al. | |
| 6,323,846 B1 | 11/2001 | Westerman et al. | |
| 8,698,775 B2 | 4/2014 | Huang et al. | |
| 8,842,094 B2 * | 9/2014 | Hsu | G06F 3/044 345/174 |
| 9,086,774 B2 | 7/2015 | Hotelling et al. | |
| 9,105,255 B2 | 8/2015 | Brown et al. | |

(Continued)

FOREIGN PATENT DOCUMENTS

| | | |
|---|---|---|
| GB | 2542854 | 4/2017 |
| WO | WO 2017/056900 | 4/2017 |

OTHER PUBLICATIONS

Zhi et al., "High Precision Active-Matrix Self-Capacitive Touch Panel Based on Fluorinated ZnO Thin-Film Transistor", Journal of Display Technology, vol. 11, No. 1 (2015).

(Continued)

*Primary Examiner* — Sardis F Azongha
(74) *Attorney, Agent, or Firm* — Renner, Otto, Boisselle & Sklar, LLP

(57) ABSTRACT

A touch panel includes a. plurality of electrodes arranged in an electrode array, wherein the plurality of electrodes includes a plurality of touch panel elements. A controller is configured to measure a charge that flows into or out of an electrode of the electrode array when the electrode is charged or discharged to a particular voltage, and configured to connect neighboring electrodes in the electrode array to a reference potential and to a voltage waveform. A sensing system makes a first measurement of the charge flowing into or out of the electrode while a set of neighboring electrodes are driven with the voltage waveform, and makes a second measurement while the set of neighboring electrodes are connected to the reference potential. The controller further is configured to distinguish conductive from non-conductive objects, based on a comparison of the two measurements.

20 Claims, 18 Drawing Sheets

(56) References Cited

U.S. PATENT DOCUMENTS

| | | | |
|---|---|---|---|
| 9,250,735 B2 | 2/2016 | Kim et al. | |
| 9,448,675 B2 | 9/2016 | Morein et al. | |
| 9,459,746 B2* | 10/2016 | Rosenberg | G06F 3/044 |
| 9,645,675 B2 | 5/2017 | Ye | |
| 10,032,061 B2 | 7/2018 | Chia et al. | |
| 2009/0256815 A1 | 10/2009 | Westerinen et al. | |
| 2010/0001973 A1 | 1/2010 | Hotelling et al. | |
| 2012/0038583 A1* | 2/2012 | Westhues | G06F 3/0412 345/174 |
| 2012/0319992 A1 | 12/2012 | Lee | |
| 2014/0132559 A1 | 5/2014 | Kim | |
| 2015/0049044 A1* | 2/2015 | Yousefpor | G06F 3/044 345/174 |
| 2015/0130747 A1 | 5/2015 | Tsai | |
| 2015/0179122 A1* | 6/2015 | Brown | G06F 3/0416 345/174 |
| 2016/0320886 A1 | 11/2016 | Kim et al. | |
| 2016/0364068 A1 | 12/2016 | Cheng et al. | |
| 2017/0102826 A1 | 4/2017 | Hamaguchi | |
| 2017/0139523 A1 | 5/2017 | Chang et al. | |
| 2018/0204036 A1* | 7/2018 | Akhavan Fomani | G06K 9/0002 |

OTHER PUBLICATIONS

Office Action for U.S. Appl. No. 15/782,947 dated Dec. 31, 2018.
Office Action for U.S. Appl. No. 15/782,947 dated Apr. 1, 2019.

\* cited by examiner

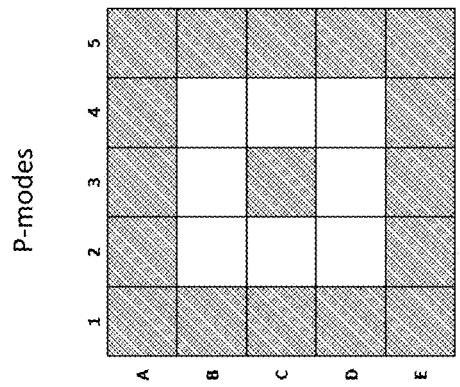
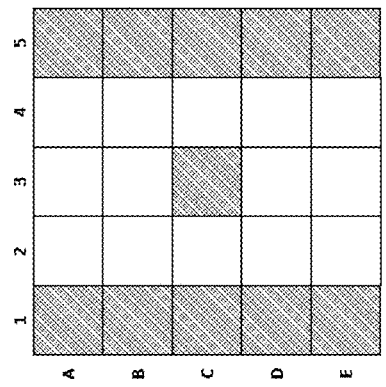
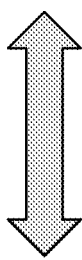
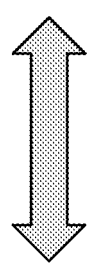
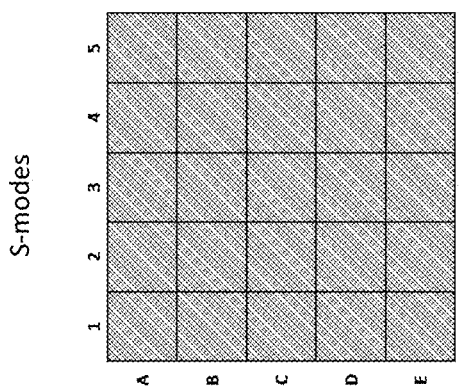
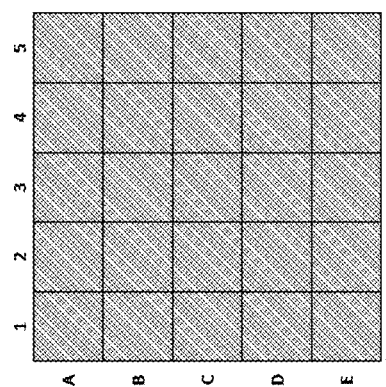
FIG. 14A    FIG. 14B

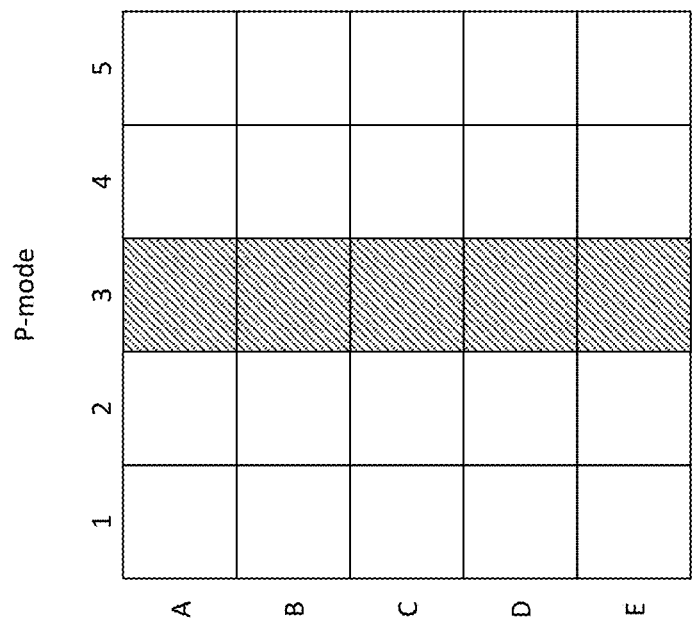
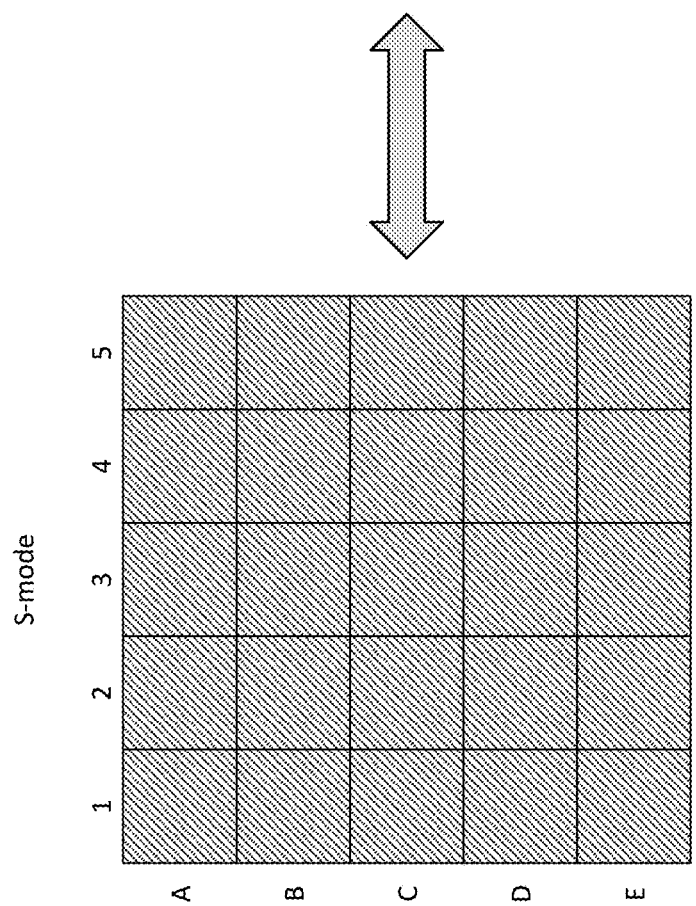
FIG. 15 ically applied to touch panels is incapable of detecting input from non-conductive or insulating objects, for example made of wood, plastic

CAPACITIVE TOUCH SENSING WITH CONDUCTIVITY TYPE DETERMINATION

TECHNICAL FIELD

The present invention relates to touch panel devices. In particular, this invention relates to capacitive type touch panels. Such a capacitive type touch panel device may find application in a range of consumer electronic products including, for example, mobile phones, tablet and desktop PCs, electronic book readers and digital signage products.

BACKGROUND ART

Touch panels have become widely adopted as the input device for a range of electronic products such as smartphones and tablet devices.

Most high-end portable and handheld electronic devices now include touch panels. These are most often used as part of a touchscreen, i.e., a display and a touch panel that are aligned so that the touch zones of the touch panel correspond with display zones of the display.

The most common user interface for electronic devices with touchscreens is an image on the display, the image having points that appear interactive. More particularly, the device may display a picture of a button, and the user can then interact with the device by touching, pressing or swiping the button with their finger or with a stylus. For example, the user can "press" the button and the touch panel detects the touch (or touches). In response to the detected touch or touches, the electronic device carries out some appropriate function. For example, the electronic device might turn itself off, execute an application, or the like.

Although a number of different technologies can be used to create touch panels, capacitive systems have proven to be the most popular due to their accuracy, durability and ability to detect touch input events with little or no activation force.

A well-known approach to capacitive sensing applied to touch panels is the projected capacitive approach. This approach includes the mutual-capacitance method and the self-capacitance method.

In the mutual-capacitance method, as shown in FIG. 1, a drive electrode 100 and sense electrode 101 are formed on a transparent substrate (not shown). A changing voltage or excitation signal is applied to the drive electrode 100 from a voltage source 102. A signal is then generated on the adjacent sense electrode 101 by means of capacitive coupling via the mutual coupling capacitor 103 formed between the drive electrode 100 and sense electrode 101. A current measurement unit or means 104 is connected to the sense electrode 101 and provides a measurement of the size of the mutual coupling capacitor 103. When the input object 105 (such as a finger or stylus) is brought into close proximity to both electrodes, it forms a first dynamic capacitor to the drive electrode 106 and a second dynamic capacitor to the sense electrode 107. If the input object is connected to ground, as is the case for example for a human finger connected to a human body, the effect of these dynamically formed capacitances is manifested as a reduction of the amount of capacitive coupling in between the drive and sense electrodes and hence a reduction in the magnitude of the signal measured by the current measurement unit or means 104 attached to the sense electrode 101.

In the self-capacitance method, as shown in FIG. 2, a drive electrode 200 is formed on a transparent substrate (not shown). A changing voltage or excitation signal is applied to the drive electrode 200 from a voltage source 201. A current measurement means 202 is connected to the electrode 200 and provides a measurement of the size of the self-capacitance 203 of the electrode to ground. When the input object 105 is brought into close proximity to the electrode, it changes the value of the self-capacitance 203. If the input object is connected to ground, as is the case for example of a human finger connected to a human body, the effect is to increase the self-capacitance of the electrode to ground 203 and hence to increase the magnitude of the signal measured by the current measurement means 202 attached to the sense electrode 200.

As is well-known and disclosed, for example, in U.S. Pat. No. 5,841,078 (Bisset et al, issued Oct. 30, 1996), by arranging a plurality of drive and sense electrodes in a grid pattern to form an electrode array, the mutual-capacitance sensing method may be used to form a touch panel device. FIG. 3 shows a suitable pattern of horizontal electrodes 300 that may be configured as drive electrodes, and vertical electrodes 301 that may be configured as sense electrodes. An advantage of the mutual-capacitance sensing method is that multiple simultaneous touch input events may be detected.

It is well-known that by arranging a plurality of electrodes in a grid pattern to form an electrode array, the self-capacitance sensing method may be used to form a touch panel device. FIG. 3 shows a suitable pattern of horizontal electrodes 300 and vertical electrodes 301 that may be configured as sense electrodes. However, a limitation of such a device is that it cannot reliably detect simultaneous touches from multiple objects.

It is also well-known and disclosed, for example, in U.S. Pat. No. 9,250,735 (Kim et al, issued Feb. 2, 2016), that by arranging a plurality of electrodes in a two dimensional array, and by providing an electrical connection from each electrode to a controller, this self-capacitance sensing method may be used to form a touch panel device that is able to reliably detect simultaneous touches from multiple objects. Mutual capacitance sensing may also be used with such a two dimensional array of separately-connected electrodes, for example as disclosed in US 2016/0320886 (Kim et al, published Nov. 3, 2016).

In many touch screens the touch panel is a device independent of the display, known as an "out-cell" touch panel. The touch panel is positioned on top of the display, and the light generated by the display crosses the touch panel, with an amount of light being absorbed by the touch panel. In more recent implementations, part of the touch panel is integrated within the display stack, and touch panel and display may share the use of certain structures, such as transparent electrodes. This is known as an "in-cell" touch panel. This integration of the touch panel into the display structure seeks to reduce cost by simplifying manufacture, as well as reducing the loss of light throughput that occurs when the touch panel is independent of the display and located on top of the display stack.

A limitation of the capacitance measurement techniques described above as conventionally applied to touch panels is that they are incapable of detecting input from non-conductive or insulating objects, for example made of wood, plastic or the like. A non-conductive object that has a dielectric permittivity different to air will cause the measured array capacitances to change when in close proximity to the touch panel surface. However, the magnitude of the resulting signal is very small—for example, less than 1% of that generated by a conductive object—and is dependent on the type of material the non-conductive object is made of and the ambient environment conditions. This disadvantageously reduces the usability of the touch panel since it is restricted to operation using conductive input objects, such as a finger or metallic pen or stylus. In particular, the user cannot operate a touch panel reliably while wearing normal (non-conductive) gloves or while holding a non-conductive object such as a plastic pen.

U.S. Pat. No. 9,105,255 (Brown et al, issued Aug. 11, 2015) discloses a type of mutual-capacitance touch panel that is able to detect non-conductive objects, and to distinguish whether an object is conductive or non-conductive. This is achieved by measuring multiple mutual capacitances formed over different coupling distances. The type of object (conductive or non-conductive) can be determined based on the changes in the multiple mutual capacitances. The multiple mutual capacitances are formed between an array of row and column electrodes.

Commonly owned U.S. patent application Ser. No. 15/409,910 discloses a method for detecting non-conductive objects, or for distinguishing between conductive and non-conductive objects, using a two dimensional array of electrodes, each of which have a separate connection to a controller. The controller measures the mutual capacitance between groups of electrodes during multiple measurement periods. In each measurement period, the controller assigns some electrodes as drive electrodes, some electrodes as sense electrodes, and some electrodes as unused electrodes. The controller applies a drive signal to the drive electrodes, and measures the coupling between the drive electrodes and each sense electrode.

SUMMARY OF THE INVENTION

The present invention relates to a controller and method of driving a capacitive touch panel, wherein the touch panel comprises a two dimensional array of electrodes, and the method of driving allows the detection of both conductive and non-conductive objects by a self-capacitive sensing method only. The present invention can use any such two dimensional array of electrodes, and does not depend on any particular touch panel structure, fabrication technique, or electrode connection method.

BRIEF DESCRIPTION OF DRAWINGS

FIGS. 14A and 14B show alternative configurations of electrodes in the S-mode and P-mode.

FIG. 15 illustrates how to configure the S-mode and P-mode by addressing complete columns of touch elements.

DETAILED DESCRIPTION OF INVENTION

Figure 1:
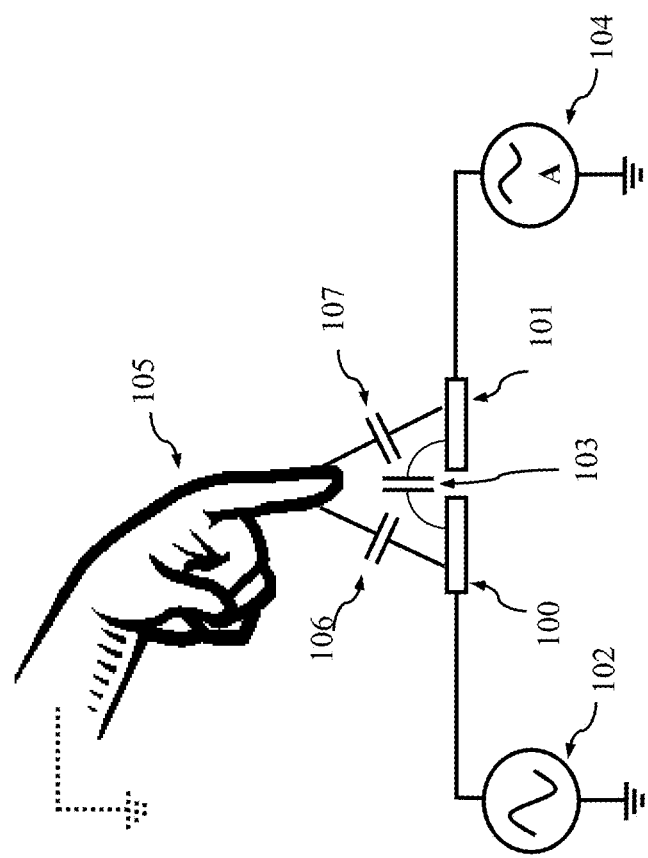
FIG. 1 shows a typical implementation of a mutual-capacitance touch panel.
Figure 2:
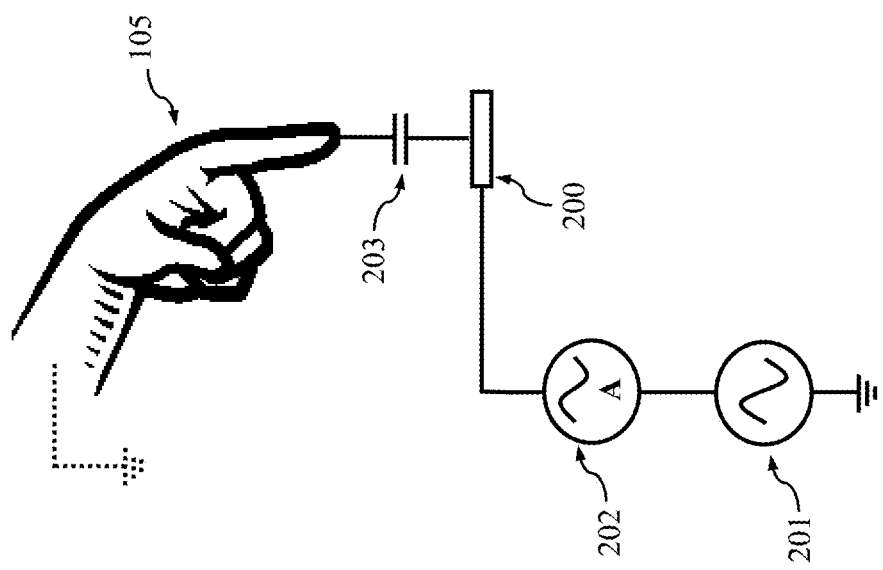
FIG. 2 shows a typical implementation of a self-capacitance touch panel.
Figure 3:
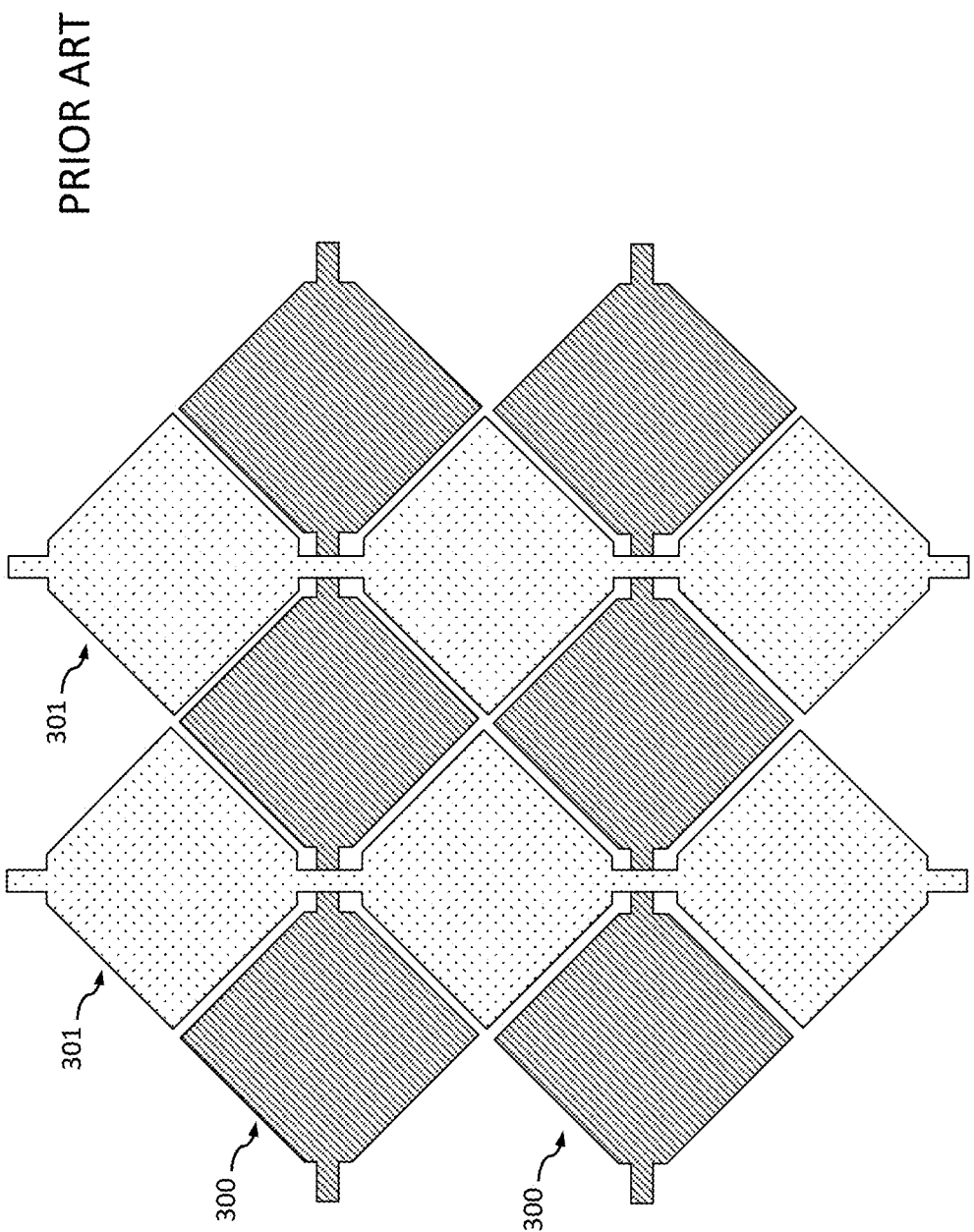
FIG. 3 shows a typical pattern of vertical and horizontal electrodes that may be used for mutual- or self-capacitance sensing.
Figure 4:
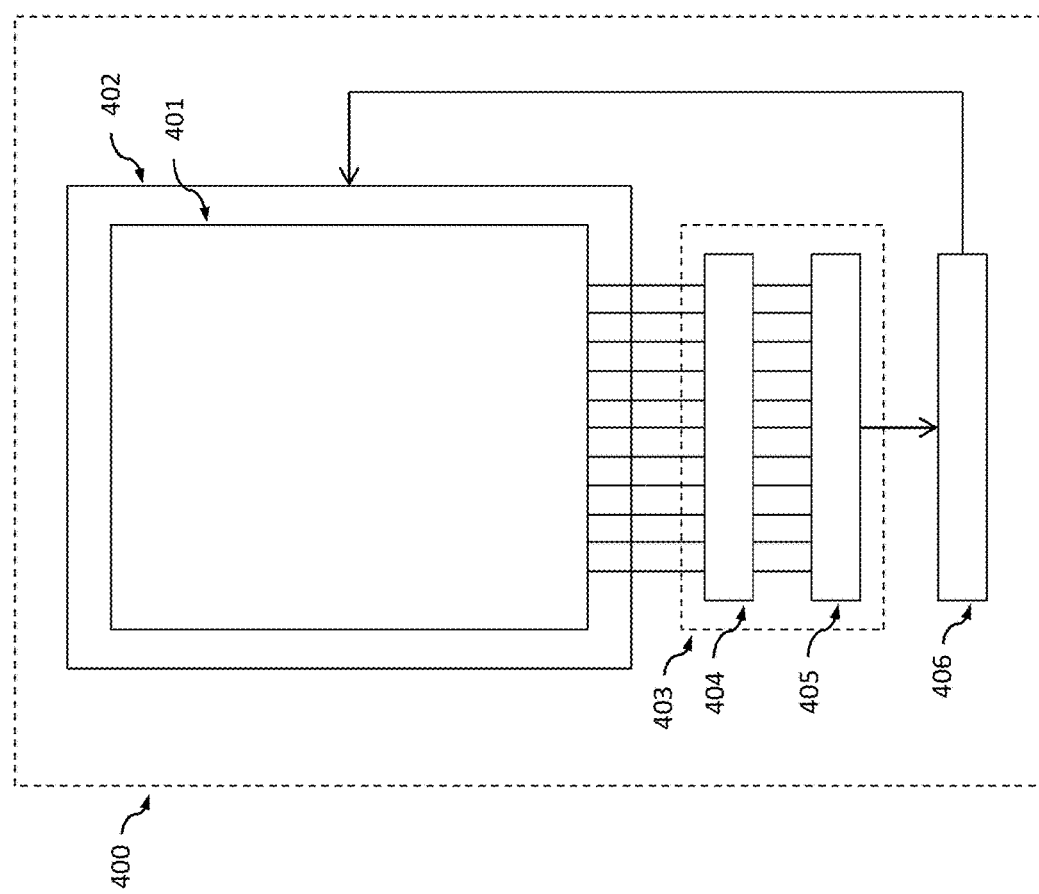
FIG. 4 shows a touch panel display system including an active matrix touch sensor panel integrated with a display.

The present invention provides a controller and method of driving a capacitive touch panel that may be used, for example, in touch panel display systems or the like. FIG. 4 shows one embodiment of such a touch panel display system 400. This system includes a touch sensor panel 401, connected to a touch panel controller 403. The controller 403 may include a multiplexer unit 404 and a measurement/processing unit 405. In other embodiments, the multiplexer unit 404 may be separate from the controller 403. The controller detects touches on the touch sensor panel and determines the properties of the touches. This information is provided to a system control unit 406 that may include, for example, a processor, memory, and a display driver. The system control unit 406 outputs visual information to a display 402. The display may be, for example, an LCD or an OLED display or another type of display. The system control unit 406 may perform an action and may modify the visual information in response to touches detected by the controller 403.

The present invention can include any two dimensional electrode array.

Here, "two dimensional array" means a number of electrodes arranged on or near a surface such that there is a first number of electrodes in a first direction, and a second number of electrodes in a second direction. Note that the array may include electrodes that are separated from each other in three dimensions, for example if different electrodes are on different layers of the touch panel, or if the touch panel surface is curved. Not also that the electrodes may overlap each other.

Figure 5:
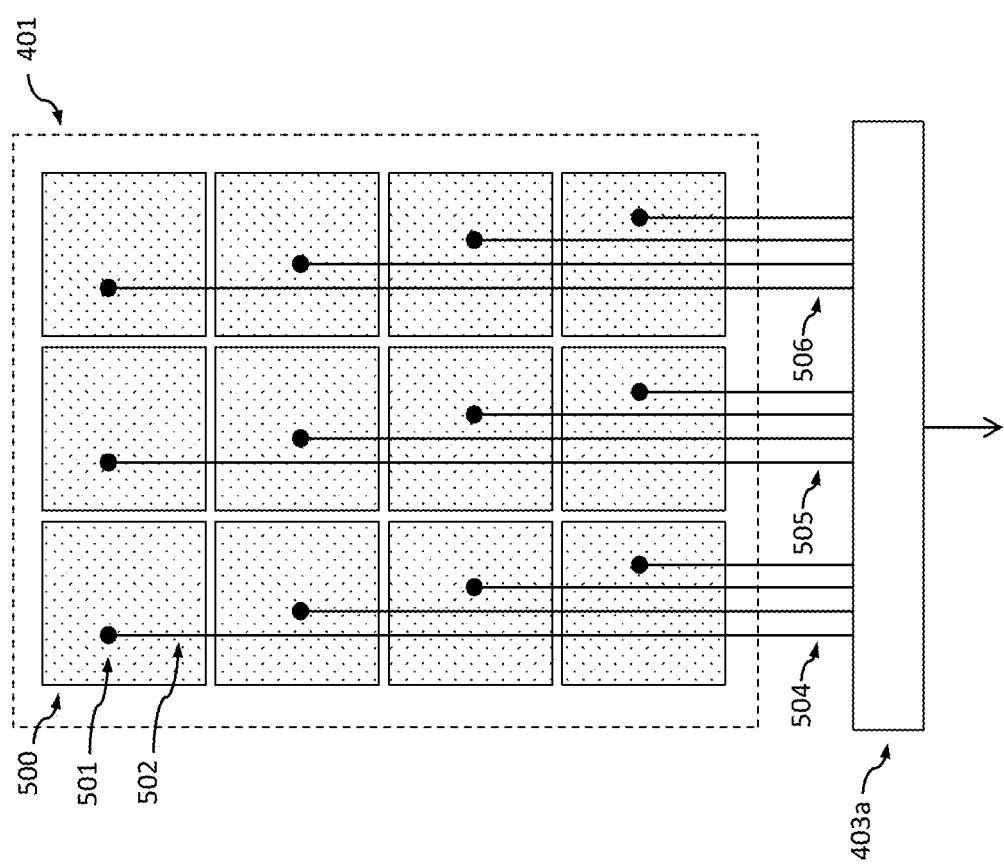
FIG. 5 shows a two-dimensional array of electrodes on a first layer, with connections on a second layer to a controller.

FIG. 5 shows one embodiment of a two dimensional electrode array forming a touch sensor panel 401. This array includes twelve square electrodes 500 formed on a first layer, with four electrodes arranged in a first direction and three electrodes arranged in a second direction. Vias 501 connect each electrode 500 on the first layer to connecting lines 502 on a second layer. By this means, each electrode 500 is separately connected to a controller 403a by connecting lines 502. The first column of electrodes is connected by connecting lines 504, the second column is connected by connecting lines 505, and the third column is connected by means of connecting lines 506.

Figure 6:
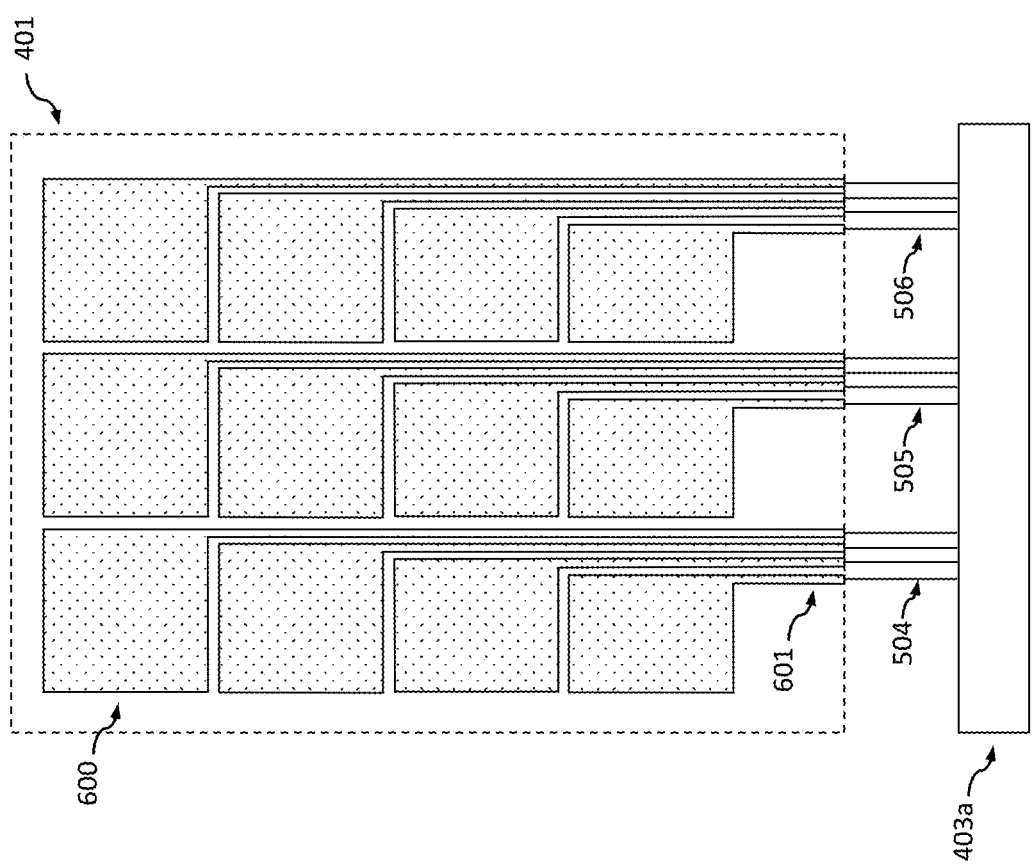
FIG. 6 shows another embodiment of a two dimensional electrode array forming a touch sensor panel.

FIG. 6 shows another embodiment of a two dimensional electrode array forming a touch sensor panel 401. This array includes twelve square electrodes 600 formed on a first layer, with four electrodes arranged in a first direction and three electrodes arranged in a second direction. Each electrode 600 is separately connected to a controller 403a by means of conductive lines 601 on the first layer, and additional connecting lines 504, 505, and 506 similar to the previous embodiment.

It will be clear to those skilled in the art that there are many two dimensional electrode array structures that may be used. It will also be clear that many of these structures can be made as discrete "out-cell" touch panels, which may be bonded to a separate display, and that many of these structures can be integrated within a display device as an "in-cell" or "hybrid in-cell" touch panel. Furthermore, the electrode array structure may use one conductive layer or two conductive layers or more. Similarly, the electrodes may be disposed on one layer or on more than one layer.

For example, one way to form the electrodes 500 of FIG. 5 and the electrodes 600 of FIG. 6 is to deposit and pattern a transparent conductive layer, made of a material such as ITO, on a transparent substrate. This may be done using standard photolithographic or printing techniques.

The vias 501 and connecting lines 502 of FIG. 5 may also be formed using standard photolithographic or printing techniques. For example, an insulating layer may be deposited on top of the first conducting layer and patterned to produce holes for the vias, and a second conductive layer may be deposited on top of the insulating layer. This second conductive layer forms the vias 501, and may be patterned to form the connecting lines 502. These techniques are suitable for producing a discrete ("out-cell") touch panel.

Alternatively, the touch panel may be integrated within a display device. For example, the electrodes 500 of FIG. 5 and the electrodes 600 of FIG. 6 may be formed by segmenting the VCOM layer of a liquid crystal display device. Similarly, the vias 501 and connecting lines 502 may be formed using the same layering processes that are used to fabricate the display data and/or gate lines.

Structures and techniques for fabricating suitable out-cell and in-cell touch panels are well-known in the prior art. The present invention can use any two dimensional array of electrodes, and does not depend on any particular touch panel structure or fabrication technique.

The present invention shows how a touch sensing system using a self-capacitance driving method may be configured to detect non-conductive objects effectively.

Figure 7:
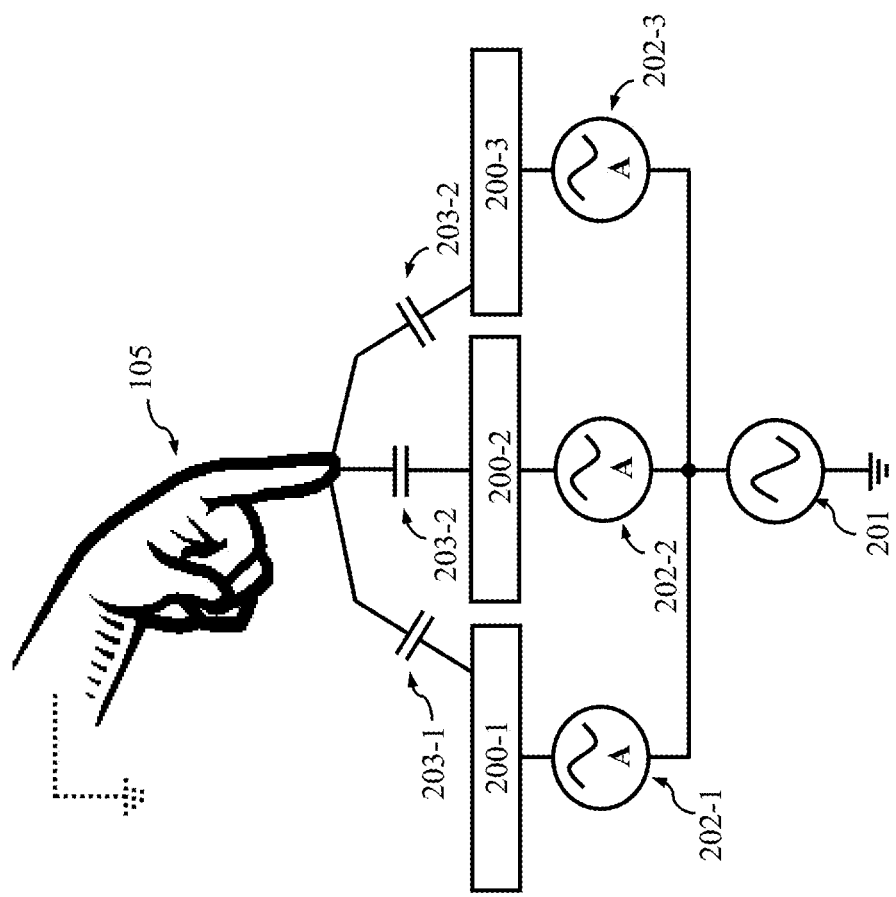
FIG. 7 shows implementation of a self-capacitance touch panel in accordance with embodiments of the present invention.

With reference to FIG. 7, FIG. 7 shows a touch electrode 200-2, surrounded by an arbitrary number of neighbouring electrodes, which in the figure are represented by electrodes 200-1 and 200-3. The electrodes are of arbitrary shape, and are driven in a self-capacitance configuration. This is illustrated by the way the signal source 201 is shared by the electrodes, while each one has an independent measuring circuit 202-x (202-1, 202-2, and 202-3 in this example). This is by way of example only, and other self-capacitance driving arrangements may be used in practice. In this configuration, the touch panel controller can measure changes in all the self-capacitances 203-x (203-1, 203-2, and 203-3 in this example). In particular, the change in self-capacitance 203-2 will be referred to as $\Delta C_s$. This configuration will be referred as S-mode.

In an alternative configuration, the touch electrode 200-2 may be supplied with a different drive signal from the neighbouring electrodes 200-1 and 200-3.

In another self-capacitance sensing configuration, the measuring circuits 202-1 and 202-3 may be omitted. In this case, the touch panel controller can measure only the change in the self-capacitance 203-2 ($\Delta C_s$) of electrode 200-2. Measurements of different electrodes or groups of electrodes may be made sequentially.

Figure 8:
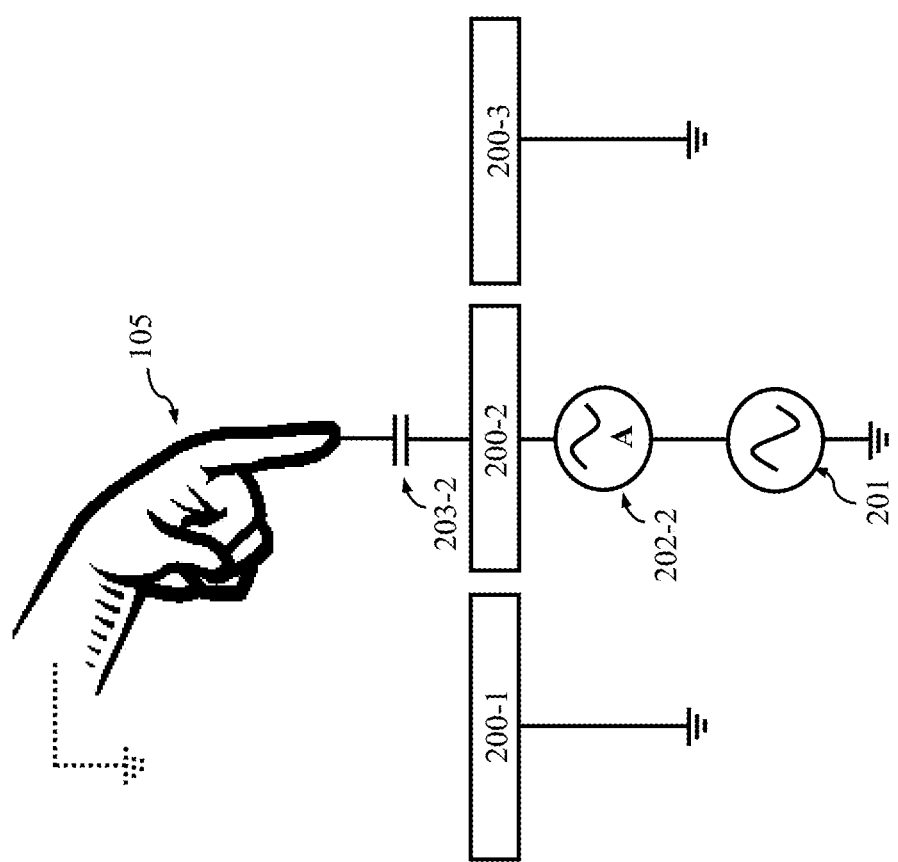
FIG. 8 shows implementation of a hybrid capacitance touch panel in accordance with embodiments of the present invention.

FIG. 8 shows a second configuration for electrodes 200-x, which will be referred as P-mode. In this configuration, all the electrodes in a certain neighbourhood of electrode 200-2, represented by electrodes 200-1 and 200-3, are connected to a reference potential. By way of example, in FIG. 8 the reference potential has been chosen as ground, but any other reference potential may be chosen. Electrode 200-2 remains connected to the touch panel controller as in FIG. 7. In the P-mode, the touch panel controller measures the change in the capacitance 203-2 of electrode 200-2. But in this case the change in capacitance 203-2 is not only given by the change in self-capacitance of electrode 200-2, but there is also a certain contribution from the change in a "pseudo-mutual" capacitance between electrode 200-2 and its grounded neighbourhood. Therefore, this hybrid measured capacitance change $\Delta C_h$ of electrode 200-2 will have a value $\Delta C_h = (\Delta C_s + \Delta C_p)$, where $\Delta C_s$ is the change in self-capacitance component, and $\Delta C_p$ is the change in pseudo-mutual capacitance component.

This pseudo-mutual capacitance of electrode 200-2 with respect to its grounded neighbourhood is sensed in self-capacitance mode, i.e. the driven and sensed electrode is just 200-2. This is different from a mutual capacitance measurement, where the change in capacitance between a pair of electrodes is measured by driving one electrode and sensing the other.

In exemplary embodiments of the present invention, the touch panel controller first measures the electrodes 200-x in the S-mode, obtaining $\Delta C_s$ for electrode 200-2. Next, the touch panel controller measures the electrodes 200-x in the P-mode, obtaining $\Delta C_h$ for electrode 200-2. Once these two measurements are made, the controller can subtract the first value $\Delta C_s$ from the last value $\Delta C_h$ to isolate the pseudo-mutual capacitance component $\Delta C_p$ of electrode 200-2. This procedure can then be repeated for all the touch electrodes in the panel.

Figure 9:
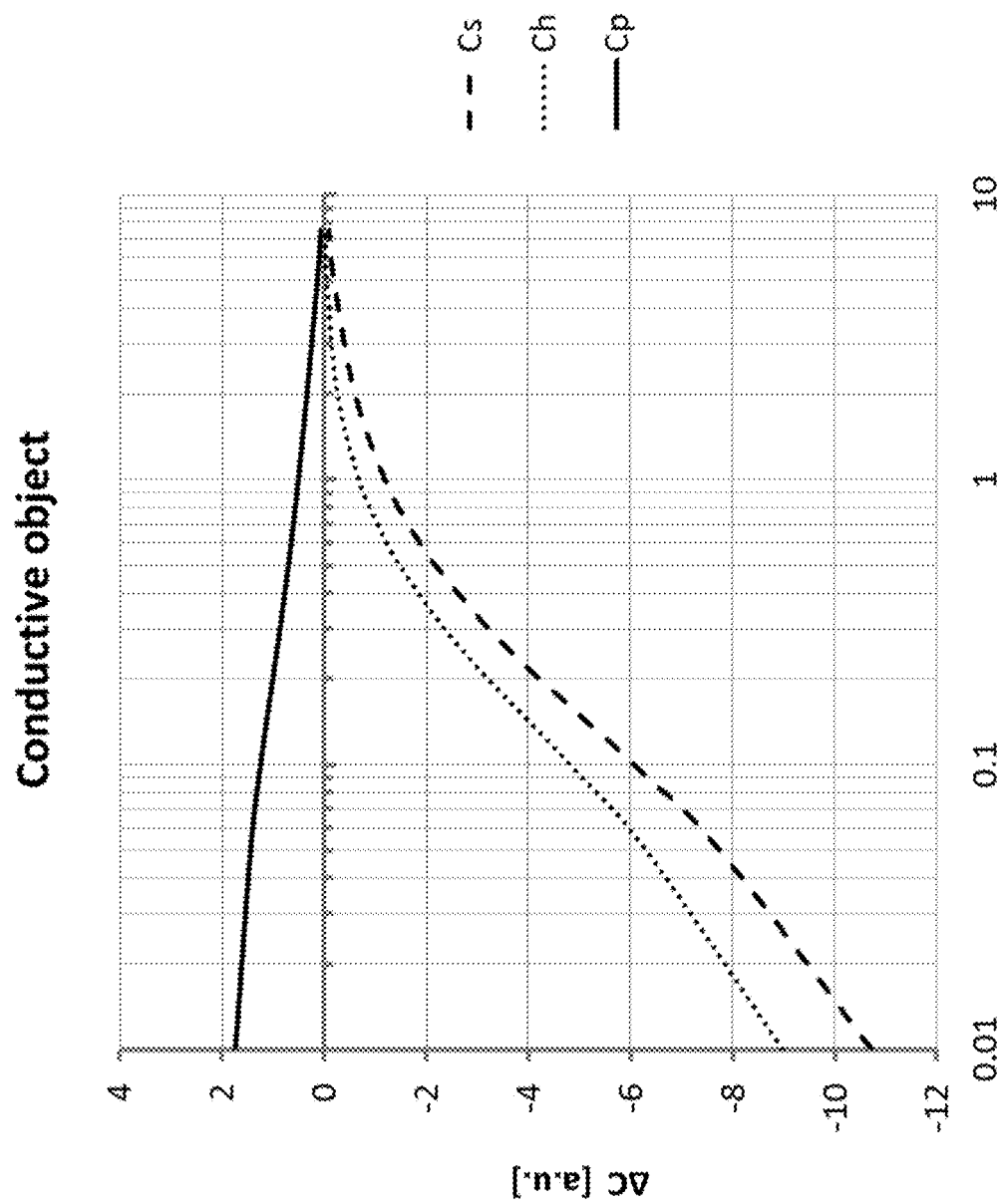
FIG. 9 shows an example plot of signals $\Delta C_s$, $\Delta C_h$ and $\Delta C_p$, for a conductive object as it approaches to the surface of a touch panel.

FIG. 9 shows an example plot of the signals $\Delta C_s$, $\Delta C_h$ and $\Delta C_p$, for a conductive object as it approaches to the surface of a touch panel. The self-capacitive signal $\Delta C_s$ measured in the S-mode is negative, as expected, indicating that the conductive object reduces the self-capacitance of the electrode 200-2. The pseudo-mutual contribution $\Delta C_p$ is small compared to the self-capacitance signal $\Delta C_s$, and of opposite sign to $\Delta C_s$.

Figure 10:
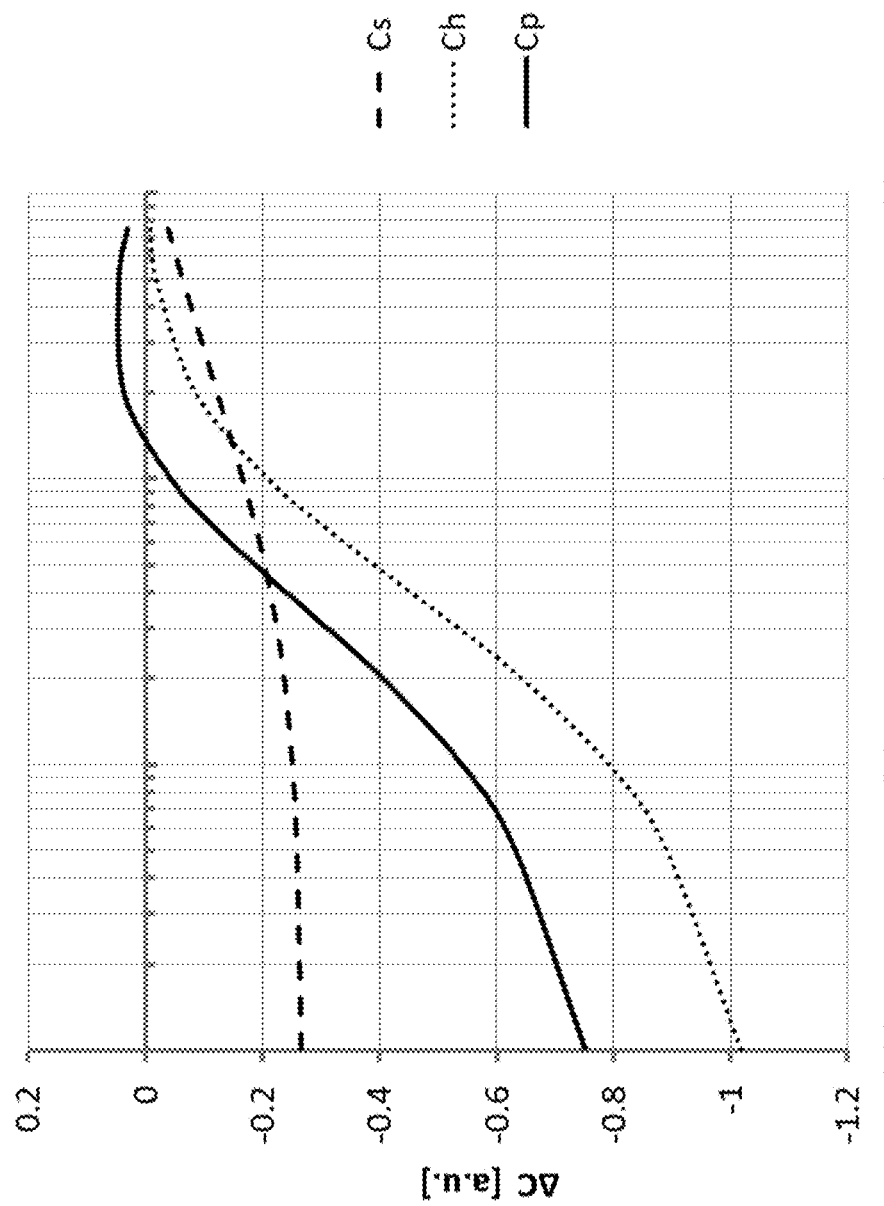
FIG. 10 shows an example plot of signals $\Delta C_s$, $\Delta C_h$ and $\Delta C_p$, for a non-conductive object as it approaches to the surface of a touch panel.

FIG. 10 shows an example plot of the signals $\Delta C_s$, $\Delta C_h$ and $\Delta C_p$, for a non-conductive object as it approaches to the surface of a touch panel. The axes scales are the same as for FIG. 9. The self-capacitive signal $\Delta C_s$, coming from the S-mode, is still negative, and crucially much smaller than for a conductive object; this illustrates the main difficulty of conventional self-capacitance schemes for detecting non-conductive objects. The pseudo-mutual contribution $\Delta C_p$ is small and positive when the object is far from the surface of the touch panel; but as the object approaches the surface, $\Delta C_p$ turns negative, and its amplitude grows steadily. In particular, for an object close enough to the surface, $\Delta C_p$ is much larger than $\Delta C_s$. For typical touch panels, $\Delta C_s$ is below detection threshold, but $\Delta C_p$ is well over the detection threshold. This result therefore shows how a non-conductive probe can be detected by using the proposed method.

Figure 11:
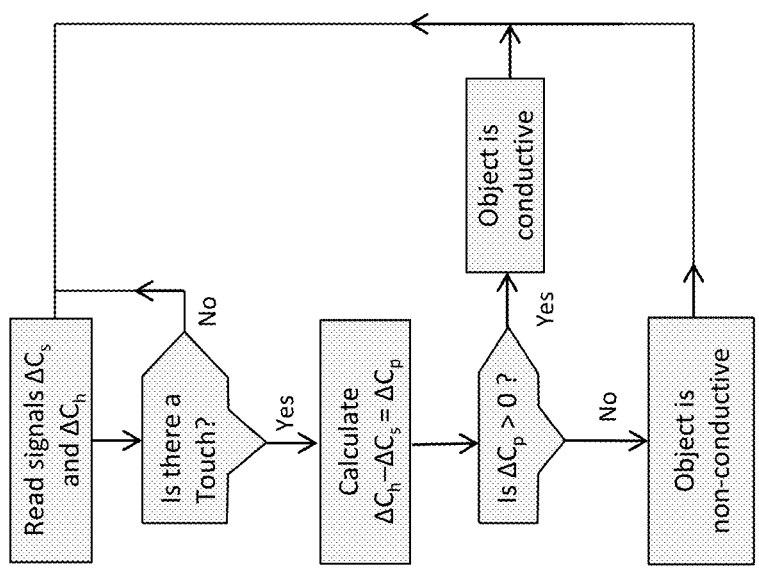
FIG. 11 shows an algorithm for detection of non-conductive objects using the touch panels of embodiments of the present invention.

An algorithm for detection of non-conductive objects using the present invention is shown in FIG. 11. First the signals $\Delta C_s$ and $\Delta C_h$ are measured. If a touch is detected by either $\Delta C_s$ or $\Delta C_h$, then $\Delta C_p$ is calculated. If $\Delta C_p$ is positive then the object is conductive; otherwise ($\Delta C_p$ is negative), then the object is non-conductive.

Another algorithm, presented in FIG. 12, makes use of the typical fact that, for self-capacitive sensing, non-conductive objects produce signals $\Delta C_s$ below a detection threshold. Hence, it can be assumed that if no object is detected when measuring $\Delta C_s$, any object detected with $\Delta C_h$ is non-conductive.

Figure 12:
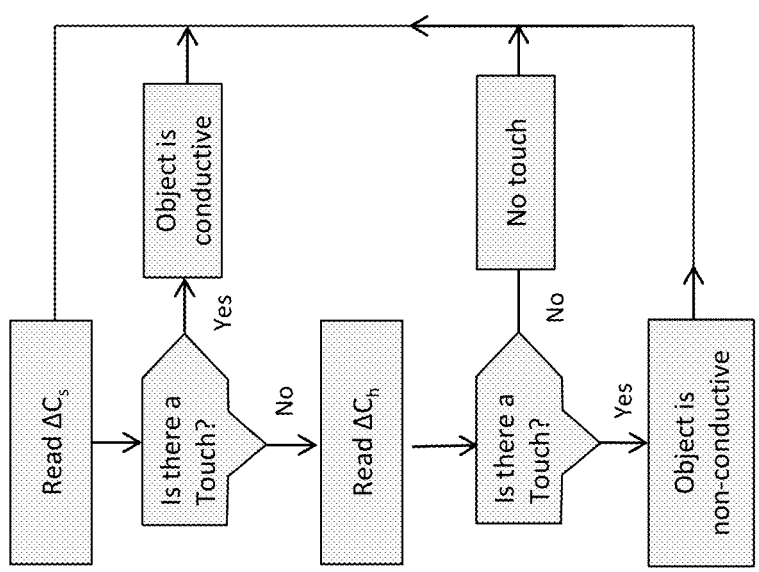
FIG. 12 shows an algorithm for detection of objects using the touch panels of embodiments of the present invention.

For some touch panels and/or touch panel controllers, implementing the algorithms of FIG. 11 and FIG. 12 may be slow due to the requirement to make multiple measurements. One possible way to overcome this additional computational burden is to perform the measurement of $\Delta C_h$ and $\Delta C_p$, for example, only once of several touch cycles, all other cycles performing conventional self-capacitive measurement cycles.

Figure 13B:
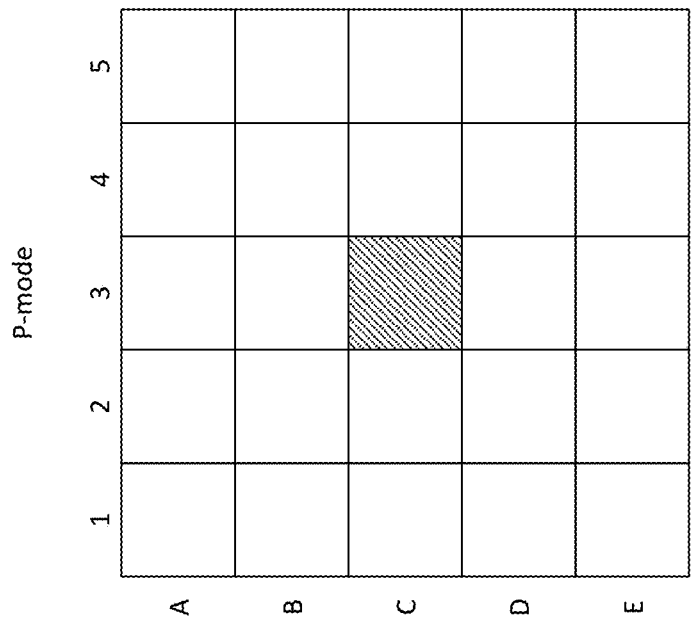
FIG. 13B shows the same matrix of electrodes in the P-mode.
Figure 13A:
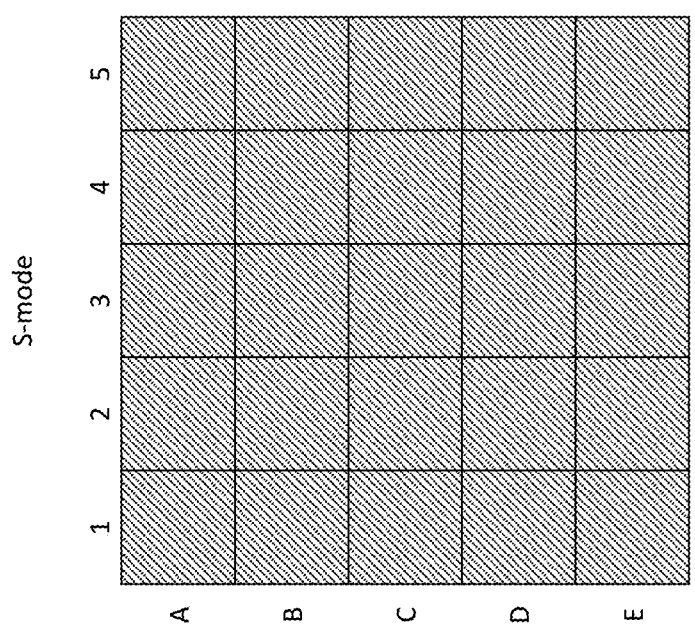
FIG. 13A shows a matrix of electrodes in the S-mode.

FIG. 13A shows a matrix of electrodes in the S-mode, and FIG. 13B shows the same matrix of electrodes in the P-mode in accordance with embodiments of the present invention. Shaded electrodes are measured in self capacitance, whereas blank electrodes are grounded. Electrode C3 is the electrode for which $\Delta C_p$ is to be calculated.

In the example of FIGS. 13A and 13B, two levels of nearest neighbours have been chosen as the neighbourhood of electrode C3. But this neighbourhood can be chosen to be larger or smaller, and does not need to be symmetric, as illustrated by the examples in FIGS. 14A and 14B.

Figure 16:
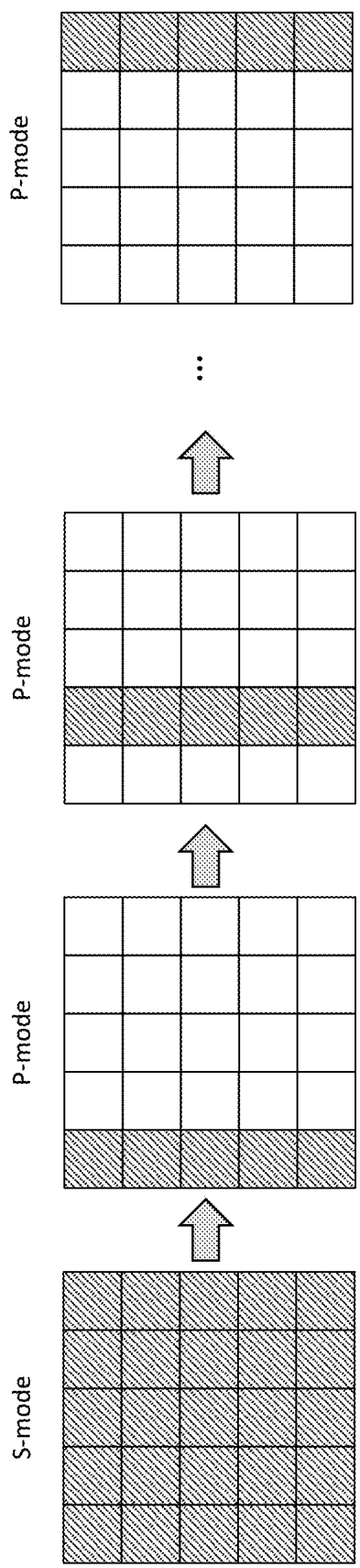
FIG. 16 shows how a P-mode column may be scanned along the length of the panel.

In practice, measuring $\Delta C_p$ individually for each touch element in a panel may be too slow or cumbersome. In some embodiments, entire rows/columns of touch elements are driven/sensed on each measuring cycle. FIG. 15 illustrates how to configure the S-mode and P-mode by addressing complete columns of touch elements. First, the touch panel controller configures the panel in S-mode, driving all the electrodes on the panel in self-capacitance mode, and measuring $\Delta C_s$ for each touch electrode on the panel. The electrodes may all be measured simultaneously, or different groups of electrodes (such as rows/columns) may be measured sequentially. Then the controller implements the P-mode by driving/sensing a complete column of touch electrodes. In order to scan $\Delta C_p$ for the entirety of the touch panel, the P-mode column may be scanned along the length of the panel, as depicted in FIG. 16. An equivalent embodiment addresses complete rows of touch elements.

Figure 17:
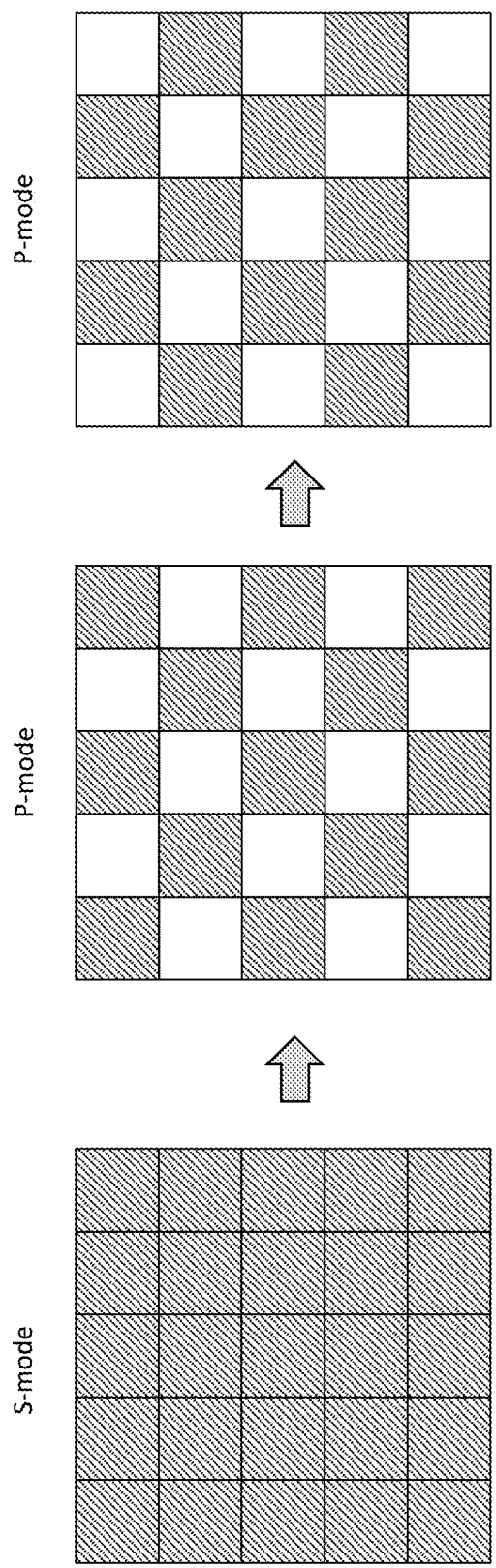
FIG. 17, shows a method of driving/sensing where a checkerboard pattern has been chosen for the P-mode as an example of electrode subset.

In some embodiments, the entire touch panel is driven/sensed on each measuring cycle in S-mode. In this case, the P-mode may be implemented by driving/sensing only a subset of touch electrodes on a first cycle, and then driving/sensing the complementary subset in a second cycle. The procedure is illustrated in FIG. 17, where a checkerboard pattern has been chosen for the P-mode as an example of electrode subset.

Other embodiments will have different operation modes to those described above, but the methodology of this invention may be adapted to these operation modes by anyone skilled in the art.

Figure 18:
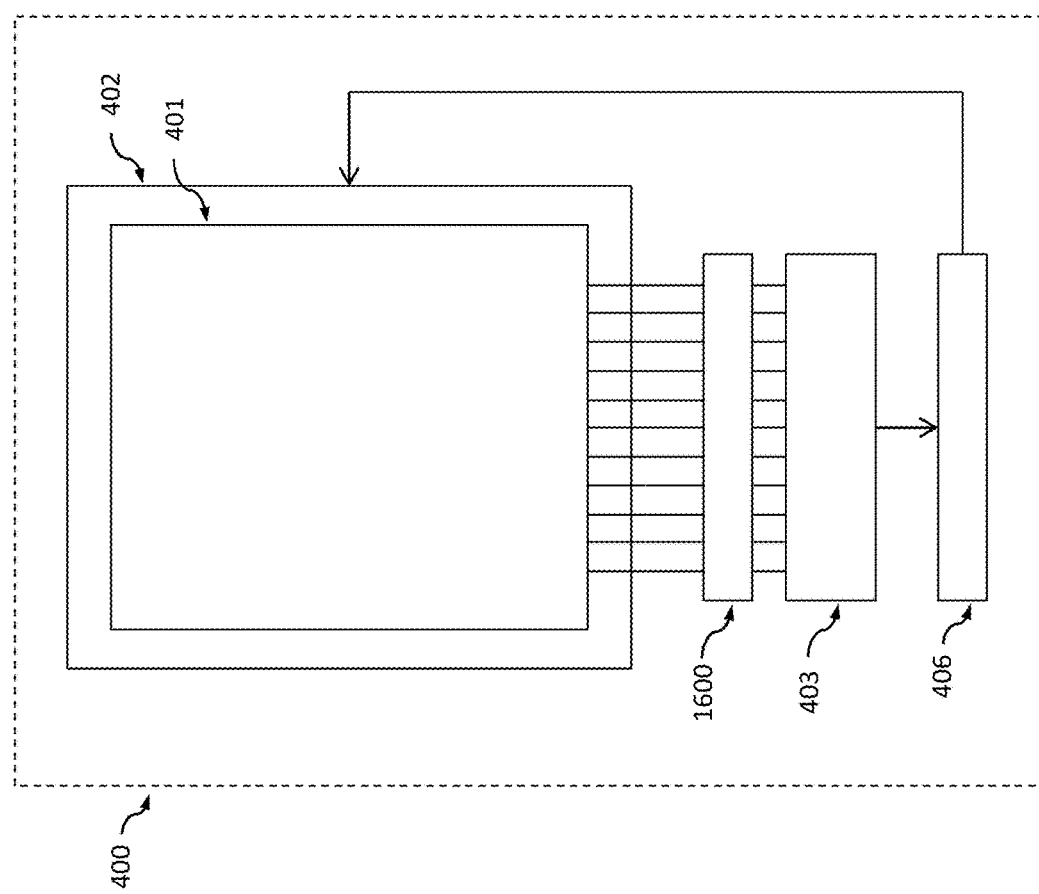
FIG. 18 shows a touch panel system with an auxiliary circuit to interface between the sensor panel and the controller.

In the P-mode a number of touch electrodes are grounded, while the rest are being driven/sensed, according to the ideas exposed above. Some touch panel controllers may be able to be configured internally to implement this function assignment. Some other touch panel controllers might need firmware of hardware modifications in order to implement P-mode patterns. Alternatively, as shown in FIG. 18, an auxiliary circuit 1600 may be added to the touch panel system 400 to interface between the sensor panel 401 and the controller 403, in order to carry out the necessary touch element switching required for a given P-mode pattern.

An aspect of the invention, therefore, is a touch panel that is configured to discriminate as between conductive and non-conductive objects based on electrode potential measurement. In exemplary embodiments, the touch panel includes a. plurality of electrodes arranged in an electrode array, wherein the plurality of electrodes includes a plurality of touch panel elements; a controller configured to measure a charge that flows into or out of an electrode of the electrode array when the electrode is charged or discharged to a particular voltage, and configured to connect neighboring electrodes in the electrode array to a reference potential and to a voltage waveform; and a sensing system that makes a first measurement of the charge flowing into or out of the electrode while a set of neighboring electrodes are driven with the voltage waveform, and makes a second measurement while the set of neighboring electrodes are connected to the reference potential. The controller further is configured to distinguish conductive from non-conductive objects based on a comparison of the two measurements. The touch panel may include one or more of the following features, either individually or in combination.

In an exemplary embodiment of the touch panel, the controller is configured to drive and/or sense a number of touch elements smaller than a total number of touch elements in the touch panel in a given measuring cycle.

In an exemplary embodiment of the touch panel, the controller is configured to drive and/or sense one of columns or rows of touch panel elements.

In an exemplary embodiment of the touch panel, a pattern of driven and/or sensed electrodes are scanned across the touch panel in successive measurement cycles.

In an exemplary embodiment of the touch panel, the controller is configured to drive and/or sense all the touch panel elements in the touch panel in a given measuring cycle.

In an exemplary embodiment of the touch panel, a pattern of driven and/or sensed electrodes is switched to a complementary pattern in successive measurement cycles.

In an exemplary embodiment of the touch panel, a circuit that selects which electrodes are connected to the voltage waveform and a timing of said connection to the voltage waveform, and that selects which electrodes are connected to a reference potential and a timing of said connection to the reference potential, is external to the controller.

In an exemplary embodiment of the touch panel, the controller includes a multiplexer.

Another aspect of the invention is method of sensing an object using touch panel that distinguishes a conductive object from a non-conductive object. In exemplary embodiments, the sensing method includes the steps of: arranging a plurality of electrodes in an electrode array, wherein the plurality of electrodes includes a plurality of touch panel elements; measuring a charge that flows into or out of an electrode of the electrode array when the electrode is charged or discharged to a particular voltage, and connecting neighboring electrodes in the electrode array to a reference potential and to a voltage waveform; making a first measurement of the charge flowing into or out of the electrode while a set of neighboring electrodes are driven with the voltage waveform; making a second measurement while the set of neighboring electrodes are connected to the reference potential; and distinguishing a conductive object from a non-conductive object based on a comparison of the two measurements. The sensing method may include one or more of the following features, either individually or in combination.

In an exemplary embodiment of the sensing method, the sensing method further includes driving and/or sensing a number of touch elements smaller than a total number of touch elements in the touch panel in a given measuring cycle.

In an exemplary embodiment of the sensing method, the controller is configured to drive and/or sense one of columns or rows of touch panel elements.

In an exemplary embodiment of the sensing method, a pattern of driven and/or sensed electrodes is scanned across the touch panel in successive measurement cycles.

In an exemplary embodiment of the sensing method, the sensing method further includes driving and/or sensing all the touch panel elements in the touch panel in a given measuring cycle.

In an exemplary embodiment of the sensing method, a pattern of driven and/or sensed electrodes is switched to a complementary pattern in successive measurement cycles.

In an exemplary embodiment of the sensing method, the sensing method further includes selecting which electrodes are connected to the voltage waveform and a timing of said connection to the voltage waveform, and selecting which electrodes are connected to a reference potential and a timing of said connection to the reference potential, using a circuit that is external to the controller.

In an exemplary embodiment of the sensing method, the electrode and the neighboring electrodes are supplied with different driving voltages.

In an exemplary embodiment of the sensing method, the sensing method further includes operating the touch panel in an S-mode in which self-capacitances of the electrode and neighboring electrodes are measured.

In an exemplary embodiment of the sensing method, the sensing method further includes operating the touch panel in a P-mode comprising measuring a change in capacitance between the electrode and a neighboring grounded electrode.

In an exemplary embodiment of the sensing method, the first measurement is made in the S-mode and the second measurement is made in the P-mode.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The present invention is suitable for improving operation of capacitive type touch panel devices in a variety of contexts. Such capacitive type touch panel devices may find application in a range of consumer electronic products including, for example, mobile phones, tablet, laptop and desktop PCs, electronic book readers and digital signage products.

What is claimed is:

1. A touch panel comprising:
a plurality of electrodes arranged in an electrode array, wherein the plurality of electrodes includes a plurality of touch panel elements;
a controller configured to measure a charge that flows into or out of an electrode of the electrode array when the electrode is charged or discharged to a particular voltage, and configured to connect neighboring electrodes in the electrode array to a reference potential and to a voltage waveform; and
a sensing system that operates in a self-capacitance mode whereby the sensing system makes a first self-capacitance measurement of the charge flowing into or out of the electrode while a set of neighboring electrodes are driven with the voltage waveform, and makes a second self-capacitance measurement while the set of neighboring electrodes are connected to the reference potential; and
wherein the controller further is configured to distinguish conductive from non-conductive objects based on a comparison of the two measurements.

2. The touch panel of claim 1, wherein the controller is configured to drive and/or sense a number of touch elements smaller than a total number of touch elements in the touch panel in a given measuring cycle.

3. The touch panel of claim 2, wherein the controller is configured to drive and/or sense one of columns or rows of touch panel elements.

4. The touch panel of claim 2, wherein a pattern of driven and/or sensed electrodes are scanned across the touch panel in successive measurement cycles.

5. The touch panel of claim 1, wherein the controller is configured to drive and/or sense all the touch panel elements in the touch panel in a given measuring cycle.

6. The touch panel of claim 5, wherein a pattern of driven and/or sensed electrodes is switched to a complementary pattern in successive measurement cycles.

7. The touch panel of claim 1, wherein a circuit that selects which electrodes are connected to the voltage waveform and a timing of said connection to the voltage waveform, and that selects which electrodes are connected to a reference potential and a timing of said connection to the reference potential, is external to the controller.

8. The touch panel of claim 1, wherein the controller includes a multiplexer.

9. The touch panel of claim 1, wherein the sensing system is configured to make the first self-capacitance measurement in an S-mode in which self-capacitances of the electrode and neighboring electrodes are measured, and configured to make the second self-capacitance measurement in a P-mode comprising measuring a change in capacitance between the electrode and a neighboring grounded electrode.

10. A method of sensing an object using touch panel, comprising the steps of:
arranging a plurality of electrodes in an electrode array, wherein the plurality of electrodes includes a plurality of touch panel elements;
measuring a charge that flows into or out of an electrode of the electrode array when the electrode is charged or discharged to a particular voltage, and connecting neighboring electrodes in the electrode array to a reference potential and to a voltage waveform;

making a first self-capacitance measurement of the charge flowing into or out of the electrode while a set of neighboring electrodes are driven with the voltage waveform;

making a second self-capacitance measurement while the set of neighboring electrodes are connected to the reference potential; and distinguishing a conductive object from a non-conductive object based on a comparison of the two measurements.

11. The sensing method of claim 10, further comprising driving and/or sensing a number of touch elements smaller than a total number of touch elements in the touch panel in a given measuring cycle.

12. The sensing method of claim 11, wherein the controller is configured to drive and/or sense one of columns or rows of touch panel elements.

13. The sensing method of claim 11, wherein a pattern of driven and/or sensed electrodes is scanned across the touch panel in successive measurement cycles.

14. The sensing method of claim 10, further comprising driving and/or sensing all the touch panel elements in the touch panel in a given measuring cycle.

15. The sensing method of claim 14, wherein a pattern of driven and/or sensed electrodes is switched to a complementary pattern in successive measurement cycles.

16. The sensing method of claim 10, further comprising selecting which electrodes are connected to the voltage waveform and a timing of said connection to the voltage waveform, and selecting which electrodes are connected to a reference potential and a timing of said connection to the reference potential, using a circuit that is external to the controller.

17. The sensing method of claim 10, wherein the electrode and the neighboring electrodes are supplied with different driving voltages.

18. The sensing method of claim 10, further comprising operating the touch panel in an S-mode in which self-capacitances of the electrode and neighboring electrodes are measured.

19. The sensing method of any of claim 18, further comprising operating the touch panel in a P-mode comprising measuring a change in capacitance between the electrode and a neighboring grounded electrode.

20. The sensing method of claim 19, wherein the first measurement is made in the S-mode and the second measurement is made in the P-mode.

* * * * *